United States Patent
Oswal et al.

(10) Patent No.: US 9,020,109 B2
(45) Date of Patent: Apr. 28, 2015

(54) LOCATION AWARE CONFERENCING SYSTEM AND METHOD

(71) Applicants: Anand K. Oswal, Pleasanton, CA (US); Pritam Shah, Fremont, CA (US)

(72) Inventors: Anand K. Oswal, Pleasanton, CA (US); Pritam Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/777,202

(22) Filed: Feb. 26, 2013

(65) Prior Publication Data

US 2014/0241515 A1    Aug. 28, 2014

(51) Int. Cl.
*H04M 11/00*    (2006.01)
*H04M 3/56*    (2006.01)

(52) U.S. Cl.
CPC ...................................... *H04M 3/56* (2013.01)

(58) Field of Classification Search
CPC .... H04N 7/15; H04L 65/403; H04L 12/1827; H04M 3/56
USPC ............... 379/93.01, 93.21, 202.01; 370/260; 455/456.1, 456.2, 456.3, 456.5
See application file for complete search history.

(56) References Cited

U.S. PATENT DOCUMENTS

| | | | | |
|---|---|---|---|---|
| 2005/0108328 | A1* | 5/2005 | Berkeland et al. | 370/260 |
| 2007/0036318 | A1* | 2/2007 | Gits et al. | 379/202.01 |
| 2009/0174763 | A1* | 7/2009 | Bengtsson et al. | 348/14.08 |
| 2010/0208625 | A1* | 8/2010 | Logan et al. | 370/260 |
| 2013/0064142 | A1* | 3/2013 | Bhow | 370/260 |

OTHER PUBLICATIONS

Yanghua Liu, et al., "*Active Speaker Indicator For Conference Participants*", U.S. Appl. No. 13/664,640, filed Oct. 31, 2012.
Marcello Caramma, "*Audio Bandwidth Extension For Conferencing*", U.S. Appl. No. 13/718,204, filed Dec. 18, 2012.

* cited by examiner

*Primary Examiner* — Stella Woo
(74) *Attorney, Agent, or Firm* — Baker Botts, L.L.P.

(57) ABSTRACT

In one embodiment, a method includes receiving a first request to join a conference from a first user device. The location of the first user device is determined. Based on the location of the first user device, the proximity of the first user device relative to endpoints configured to facilitate the conference is identified. A first one of the endpoints that is more proximate to the first user device than other endpoints is selected for handling the conferences.

22 Claims, 3 Drawing Sheets

LOCATION AWARE CONFERENCING SYSTEM AND METHOD

TECHNICAL FIELD

This disclosure relates generally to the field of communications and, more specifically, to a location aware conferencing system and method.

BACKGROUND

For some conferences or meetings, all the attendees or participants may not be in the same location. For example, some of the participants may be in one conference room, while other participants may be in another conference room and/or at various separate remote locations. Still other participants may be in transit between two locations and/or may be dialing into the conference using a mobile device. Regardless of the location of the user, conferencing systems such as WebEx or other collaborative applications require the participant to dial and/or identify a phone number that the application may dial to conference in the participant.

BRIEF DESCRIPTION OF THE DRAWINGS

For a more complete understanding of the present disclosure, reference is now made to the following description, taken in conjunction with the accompanying drawings, in which.

DETAILED DESCRIPTION

Overview

In one embodiment, a method includes receiving a first request to join a conference from a first user device. The location of the first user device is determined. Based on the location of the first user device, the proximity of the first user device relative to endpoints configured to facilitate the conference is identified. A first one of the endpoints that is more proximate to the first user device than other endpoints is selected for handling the conferences.

In another embodiment, a system includes a processor. The system also includes a non-transitory computer-readable storage medium embodying software. The software is operable when executed by the processor to receive a first request to join a conference from a first user device and determine a location of the first user device. Based on the location of the first user device, the software is operable to identify a proximity of the first user device relative to a plurality of endpoints configured to facilitate the conference. A an endpoint that is more proximate to the first user device than other endpoints is selected for handling the conference.

Description

Figure 1:
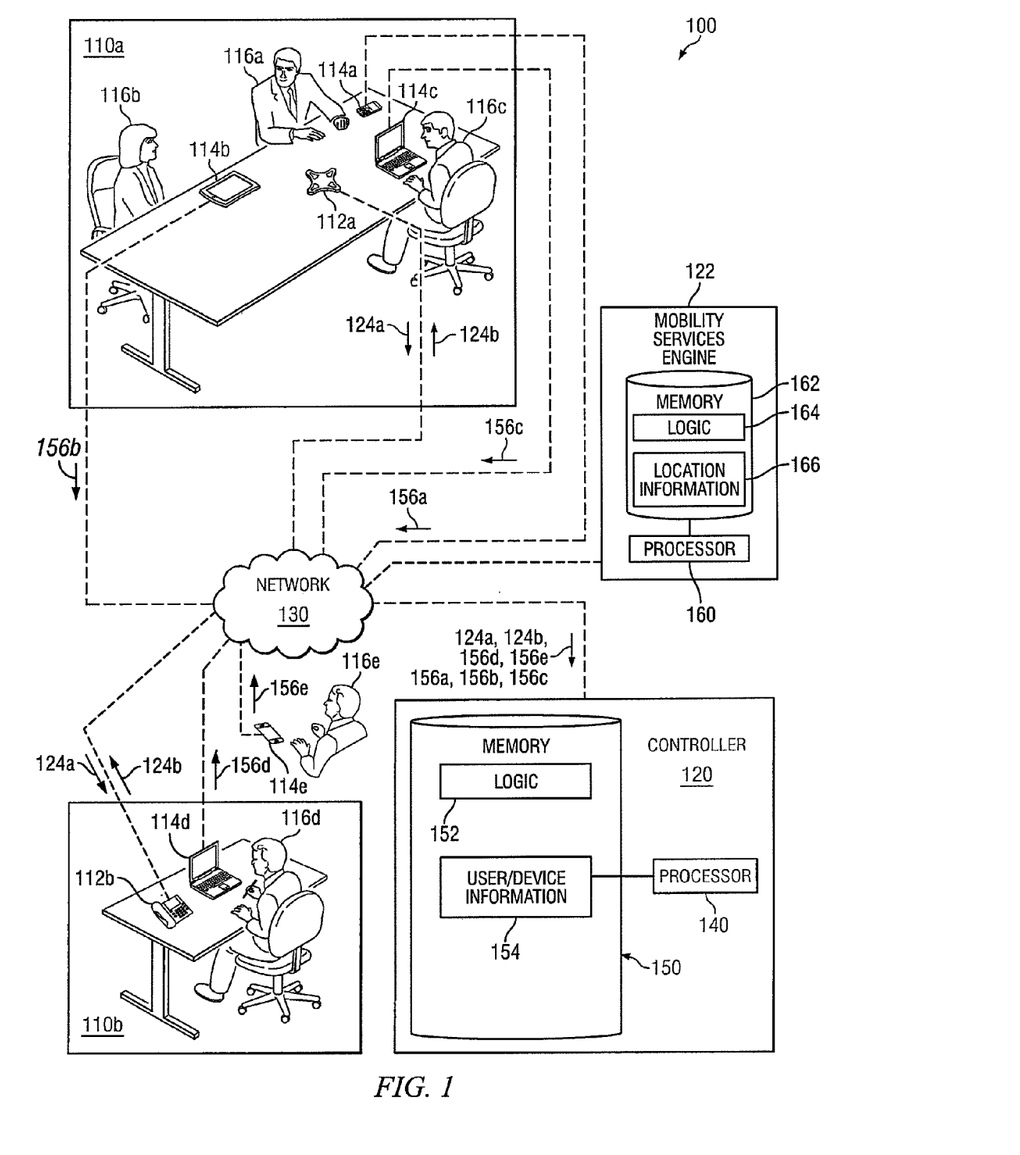
FIG. 1 illustrates an example conferencing system, in accordance with certain embodiments of the present disclosure.

FIG. 1 illustrates an example conferencing system 100, in accordance with certain embodiments of the present disclosure. In general, conferencing system 100 may allow numerous users 116, some or all of whom may be in different or remote locations, to participate in a conference. A conference may represent any meeting, conversation, or discussion between users 116. For example, conferencing system 100 may allow each user 116 to hear what remote users 116 are saying. In particular, conferencing system 100 may include one or more conference locations 110, one or more endpoints 112, one or more user devices 114, one or more users 116, a controller 120, and a mobility services engine 122. Endpoints 112, user devices 114, controller 120, and mobility services engine 122 may be communicatively coupled by a network 130.

Conference locations 110 may be any location from which one or more users 116 participate in a conference. In the example of FIG. 1, users 116a-c are located in a first conference location 110a, which may be a conference room, in a particular embodiment. User 116d is depicted as being located in a second conference location 110b, which is remote from the first conference location 110a and which may include the office of user 116d, in a particular embodiment. However, although only one user is depicted at second conference location 110b, it is recognized that any number of users 116 could be located in second conference location 110b. The depicted example also includes a fifth user 116e that is in transit between first conference location 110a and second conference location 110b. It is generally recognized, however, that the depicted conferencing system 100 is merely one example conferencing system. Conferencing system 100 may include any suitable number of conference locations 110 and any suitable number of users 116 may be located at each conference location 110 or in transit between conference locations 110. It is further recognized that conference locations 110 may include conference rooms, offices, homes, or any other suitable location.

Each conference location 110 may include an endpoint 112. Endpoint 112 may refer to any device that connects a conference location 110 to a conference. Endpoint 112 may be operable to capture audio and/or video from conference location 110 (e.g. using one or more microphones and/or cameras) and transmit audio and/or video signals 124 to endpoints 112 at other conference locations 110 (e.g. through controller 120). Endpoint 112 may also be operable to play audio and/or video signals 124 received from other endpoints 112. In some embodiments, endpoint 112 may include a speakerphone, conference phone, telephone, computer, workstation, Internet browser, electronic notebook, Personal Digital Assistant (PDA), cellular or mobile phone, pager, or any other suitable device (wireless, wireline, or otherwise), component, or element capable of receiving, processing, storing, and/or communicating information with other components of conferencing system 100. Endpoint 112 may also comprise any suitable user interface such as a display, microphone, speaker, keyboard, or any other appropriate terminal equipment usable by a user 116. Conferencing system 100 may comprise any suitable number and combination of endpoints 112.

User devices 114 may refer to any device that enables a user 116 to interact with controller 120. In some embodiments, a user device 114 may include a computer, workstation, telephone, Internet browser, electronic notebook, laptop computer, Personal Digital Assistant (PDA), cellular or mobile phone, pager, or any other suitable device (wireless, wireline, or otherwise), component, or element capable of receiving, processing, storing, and/or communicating information with other components of conferencing system 100. User device 114 may also comprise any suitable user interface such as a display, microphone, keyboard, camera, or any other appropriate equipment usable by a user 116. Conferencing system 100 may comprise any number and combination of user devices 114. In some embodiments, each user 116 may have a corresponding user device 114 situated near the user 116. In other embodiments, only some users 116 may have a user device 114.

In certain embodiments, network 130 may refer to any interconnecting system capable of transmitting audio, video, signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, controller 120 may refer to any suitable combination of hardware and/or software implemented in one or more modules to process data and provide the described functions and operations. In some embodiments, the functions and operations described herein may be performed by multiple controllers 120. In some embodiments, controller 120 may include, for example, a mainframe, server, host computer, workstation, web server, file server, a personal computer such as a laptop, or any other suitable device operable to process data. In some embodiments, controller 120 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. In some embodiments, controller 120 may be a web server running Microsoft's Internet Information Server™.

In general, controller 120 communicates with endpoints 112 and user devices 114 to facilitate a conference between users 116. In some embodiments, controller 120 may include a processor 140 and a memory 150. Processor 140 is generally operable to execute logic 152 stored in memory 150 to facilitate a conference between users 116 according to the disclosure. Processor 140 may include one or more microprocessors, controllers, or any other suitable computing devices or resources. Processor 140 may work, either alone or with components of conferencing system 100, to provide a portion or all of the functionality of conferencing system 100 described herein. In some embodiments, processor 140 may include, for example, any type of central processing unit (CPU).

Processor 140 is communicatively coupled to a memory 150. Memory 150 may refer to any suitable device capable of storing and facilitating retrieval of data and/or instructions. Examples of memory 150 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or any other volatile or non-volatile computer-readable memory devices that store one or more files, lists, tables, or other arrangements of information. Although FIG. 1 illustrates memory 150 as internal to controller 120, it should be understood that memory 150 may be internal or external to controller 120, depending on particular implementations. Also, memory 150 may be separate from or integral to other memory devices to achieve any suitable arrangement of memory devices for use in conferencing system 100.

Memory 150 is generally operable to store logic 152 and user/device information 154. Logic 152 generally refers to logic, rules, algorithms, code, tables, and/or other suitable instructions for performing the described functions and operations. In some embodiments, logic 152 includes a communication solution which provides a conferencing or other collaborative application such as WebEx, available from Cisco Systems, Inc.

User/device information 154 may be any suitable data associated with and/or used to identify or authenticate users 116. In particular embodiments, user/device information 154 may include a name, a username, an IP address, a MAC address, one or more phone numbers, and/or other identifying information. In some embodiments, user/device information 154 may be received from user devices 114. For example, when a user uses endpoint 112 or user device 114 to initiate a conferencing session, the user may input information that is used by controller 120 to set up or conduct the conferencing session. A more specific example might include the user inputting user login information such as a name and password. As another example, a user may be required to enter one or more phone numbers associated with one or more devices used the user. In other embodiments, some or all of user/device information 154 may be directly determined by logic 152. In some embodiments, user/device information 154 may be stored in a database, which may also include additional information about users 116. In general, user/device information 154 may allow controller 120 to identify one or more users 114.

In operation, logic 152, when executed by processor 140, facilitates a conference between users 116. Logic 152 may receive audio and/or video signals 124 from endpoints 112. In the example of FIG. 1, logic 152 receives audio signal 124$a$ from endpoint 112$a$ and audio signal 124$b$ from endpoint 112$b$. Audio signal 124$a$ may represent audio captured by the endpoint 112$a$, such as the voices of the users 116 proximate the endpoint 112$a$. Likewise, audio signal 124$b$ may represent audio captured by endpoint 112$b$. Logic 152 may route audio and/or video signals 124 between the endpoints 112. In the example of FIG. 1, logic 152 transmits audio signal 124$a$ to endpoint 112$b$. Likewise, logic 152 transmits audio signal 124$b$ to endpoints 112$a$. In other embodiments, logic 152 may facilitate a connection between endpoints 112 so that endpoints 112 may communicate directly to exchange audio and/or video signals 124.

Logic 152 may also receive join requests 156 from user devices 114. Join requests 156 may represent requests to join a conference. In the example of FIG. 1, logic 152 receives join requests 156$a$-$e$ from user devices 114$a$-$e$, respectively. In some embodiments, join requests 156 may include a username. The username may represent and/or be selected by the user 116 who is operating the particular user device 114 and/or endpoint 112 submitting the join request 156. In certain embodiments, logic 152 may determine the location of endpoints 112 and the location of user devices 114 relative to the endpoints 112. For example, logic 152 may determine that user device 114$a$ is proximate endpoint 112$a$.

In particular embodiments, the location of user devices 114 and endpoints 112 may be determined by mobility services engine (MSE) 122. In some embodiments, MSE 122 may refer to any suitable combination of hardware and/or software implemented in one or more modules to process data and provide the described functions and operations. In some embodiments, the functions and operations described herein may be performed by multiple MSEs 122. In some embodiments, MSE 122 may include, for example, a mainframe, server, host computer, workstation, web server, file server, a personal computer such as a laptop, or any other suitable device operable to process data. In some embodiments, MSE 122 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. In some embodiments, MSE 122 may be a web server running Microsoft's Internet Information Server™.

In general, MSE 122 communicates with controller 120, endpoints 112, and/or user devices 114 to determine the location of user devices 114 relative to endpoints 112 for the purpose of facilitating a conference between users 116. In some embodiments, MSE 122 may include a processor 160 and a memory 162. Processor 160 is generally operable to execute logic 164 stored in memory 162 to determine the locations of endpoints 112 according to the disclosure. Processor 160 may include one or more microprocessors, controllers, or any other suitable computing devices or resources. Processor 160 may work, either alone or with components of conferencing system 100, to provide a portion or all of the functionality of conferencing system 100 described herein. In some embodiments, processor 160 may include, for example, any type of central processing unit (CPU).

Processor 160 is communicatively coupled to a memory 162. Memory 162 may refer to any suitable device capable of storing and facilitating retrieval of data and/or instructions. Examples of memory 162 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or any other volatile or non-volatile computer-readable memory devices that store one or more files, lists, tables, or other arrangements of information. Although FIG. 1 illustrates memory 162 as internal to MSE 122, it should be understood that memory 162 may be internal or external to MSE 122, depending on particular implementations. Also, memory 162 may be separate from or integral to other memory devices to achieve any suitable arrangement of memory devices for use in conferencing system 100.

Memory 162 is generally operable to store logic 164 and logic information 166. Logic 164 generally refers to logic, rules, algorithms, code, tables, and/or other suitable instructions for performing the described functions and operations. In some embodiments, logic 164 includes a communications solution which provides location identification services such as Mobility Services Engine, available from Cisco Systems, Inc.

Location information 166 may be any suitable data associated with and/or used to identify the location of user devices 114. In some embodiments, location information 166 may be received from user devices 114, endpoints 112, or other components of system 100. In some embodiments, location information 166 may include identifiers for all devices 114 and endpoints 112 capable of coupling to network 130 using a WIFI connection. In some embodiments, location information 166 may include location information associated with endpoints 112 that are capable of facilitating a conferencing session. For example, location information 166 may include one or more facility maps that identify the location of endpoints 112 within an enterprise facility. In some embodiments, location information 166 may be stored in a database, which may also include additional information about user devices 114 and/or endpoints 112.

As described above, logic 164, when executed by processor 160, is configured to detect the location of a user device 114 relative to an endpoint 112 for use by controller 120 in facilitating a conferencing session. For example, it is described above that when user 116a at first conference location 110a wishes to join a conferencing session the user 116a may use user device 114a to transmit a join request 156a. In one particular embodiment, the join request may be generated in response to user 116a clicking on a URL link within an email related to a scheduled conferencing session. Specifically, a current meeting page may be displayed on user device 114a in response to user 116a clicking the URL link within the email. The meeting page may include a connect button that user 116a may select to join the conferencing session. In certain embodiments, join request 156a may be generated after and because user 116a selects the connect button. In other embodiments, the generation of the meeting page may be omitted, and the join request may be generated automatically in response to the user 116a clicking the URL link within the email.

Join request 156a may be transmitted to and received by controller 120. In certain embodiments, controller 120 may then forward join request 156a, a portion of join request 156a, or some other data relevant to the join request 156a, user 116a, and/or user endpoint 114a to MSE 122. In a particular embodiment, controller 120 may transmit a query to MSE 122 that requests location information for endpoint 114a. Logic 164 of MSE 122 may then operate to determine the location of user device 114a. In certain embodiments, logic 164 may operate to track the location of user device 114a based on the devices's WIFI connection to network 130. Specifically, and in a particular embodiment, logic 164 may use triangulation to pinpoint the location of user device 114a.

In particular embodiments, logic 164 of MSE 122 may compare the identified location of user device 114 to location information 166 to determine the nearest endpoint 112 that may be used to participate in the conferencing session. For example, when join request 156a is received from user device 114a, logic 164 may determine that endpoint 112a at first conference location 110a is the closest endpoint 112 to facilitate the teleconference for user 116a. Similarly, when join request 156d is received from user device 114d, logic 164 may determine that endpoint 112b at second conference location 110b is the closest endpoint 112 to facilitate the teleconference for user 116d. However, when join request 156e is received from user device 114e, logic 164 may determine the location of user device 114e and then further determine whether user device 114e is closer to first conference location 110a or second conference location 110b.

After logic 164 identifies the closest endpoint 112, this information may be conveyed to controller 120. Controller 120 may then determine a phone number associated with the closest endpoint 112 and call the closest endpoint 112 to initiate the conferencing session. Accordingly, in the depicted example, controller 120 may identify endpoint 112a as being closest to user device 114a and call endpoint 112a to initiate the conferencing session for user 116a. Likewise, controller 120 may identify endpoint 112b as being closest to user device 114d and call endpoint 112b to initiate the conferencing session for user 116d. With regard to user device 114e, controller 120 may identify the endpoint 112 that is closest to user device 114e and call that endpoint to initiate the conferencing session for user 116e. Additionally or alternatively, controller 120 may direct end user 116e to the location of the closest endpoint 112.

In certain embodiments, controller 120 may determine that an endpoint 112 has already initiated the conferencing session and, thus, does not need to be called. For example, controller 120 may receive a first join request 156a from user device 114a. MSE may operate to determine location information of user device 114a determine that user device 114a is proximate to endpoint 112a. As described above, MSE may provide that information to controller 120, which may then dial a phone number associated with endpoint 112a to initiate the conferencing session. If, thereafter, controller 120 receives a second joint request 156b from user device 114b. MSE may then operate to determine location information of user device 114b and determine that user device 114b is also proximate to endpoint 112a. MSE may then provide that information to controller 120. Controller 120 may determine that endpoint 112a has already been called and that the conferencing session has already been initiated at first conference location 110a. Because the conferencing session is already in progress or has already been initiated, controller 120 may recognize that no further action is needed to facilitate the conferencing session for user 116b.

It is recognized that various changes, alterations, transformations, and modifications may be made to conferencing system 100. For example, in certain embodiments, a user 116 may opt out of automatic calling and instead select to receive location information of endpoints 112. As such, controller 120 may be configured to provide endpoint location information to user devices 114 rather than automatically call the endpoint locations to initiate the conferencing session. For example, MSE 122 may operate to determine location information associated with a user device 114a and the most proximate endpoint 112a as described above. MSE 122 may transmit the location information to controller 120. However, rather than automatically dial a telephone number associated with the most proximate endpoint 112a to initiate the conferencing session, controller 120 may be configured to transmit a message to the user device 114a. In a particular embodiment, the message may include a list of phone numbers associated with multiple endpoints 112 that may be used to initiate the conferencing session. The list of phone numbers may be prioritized, in certain embodiments, such that the most proximate endpoint 112 is listed first and the furthest endpoint 112 from the user device 114 is listed last. A user may then select the endpoint 112 that the user 116 would like to use to initiate the conferencing session. Controller 120 may then dial the phone number associated with the endpoint 112 selected by the user 116.

In certain embodiments, automated dialing or user-selectable dialing may be user customizable. Thus, a user 116 may set one or more settings maintained by controller 120 that disable or enable automated dialing. For example, a user may choose to enable automated dialing such that the most proximate endpoint 112 is always automatically dialed when a join request 156 is initiated by a user device 114. Conversely, a user may choose to disable automated dialing such that the user is always presented with a prioritized list of the most proximate endpoints 112. In still other embodiments, a user 116 may disable or enable automated dialing based on location. For example, a user 116 may enable automated dialing for the user's office. Thus, controller 120 may be configured to automatically dial the user's office telephone when controller 120 determines that the user 116 is proximate to his office. Conversely, when controller 120 receives location information identifying the location of the user 116 as being outside the user's office, controller 120 may be configured to present the user 116 with a prioritized list of the most proximate endpoints 112.

As another example alteration, controller 120 may not request location of a user device 114 in response to a join request. Rather, controller 120 may register to automatically receive location information for certain or all user devices 114 that communicate with network 100. In one particular embodiment, MSE 122 may automatically operate to monitor for and detect events associated with a user device 114. The event may include, for example, a change in position, containment within a specific boundary, or some other criteria. When an event is detected, MSE 122 may determine the location of the user device 114 and match the user device 114 and/or event to any event subscriptions maintained by the MSE 122. When MSE 122 identifies a match between an event and an event subscription, MSE 122 may transmit details associated with the user device 114 and the location information associated with the user device 114 and/or event to controller 120. In this manner or some similar manner, controller 120 may subscribe to receive location information for user devices 114.

As another example, logic 164 of MSE 122 may be configured to detect the location of only those user devices 114 that are registered with network 100, in certain embodiments. For example, in a particular embodiment, network 100 may include a private enterprise network. User devices 114 may be required to register with the network 100 before a wireless or other type connection may be established between the user devices 114 and the network 100. In this manner, MSE 122 may be configured to recognize only those user devices 114 that are authorized to connect to network 100. Additionally, though controller 120 is described as receiving join requests 156a-e and then forwarding such join requests 156a-e to MSE 122, it is generally recognized that MSE 122 may receive join request 156a or the portion thereof directly from user device 114a, in certain embodiments. Thus, either or both of MSE 122 and controller 120 may receive join requests 156a-e from user devices 114a-e.

Figure 2:
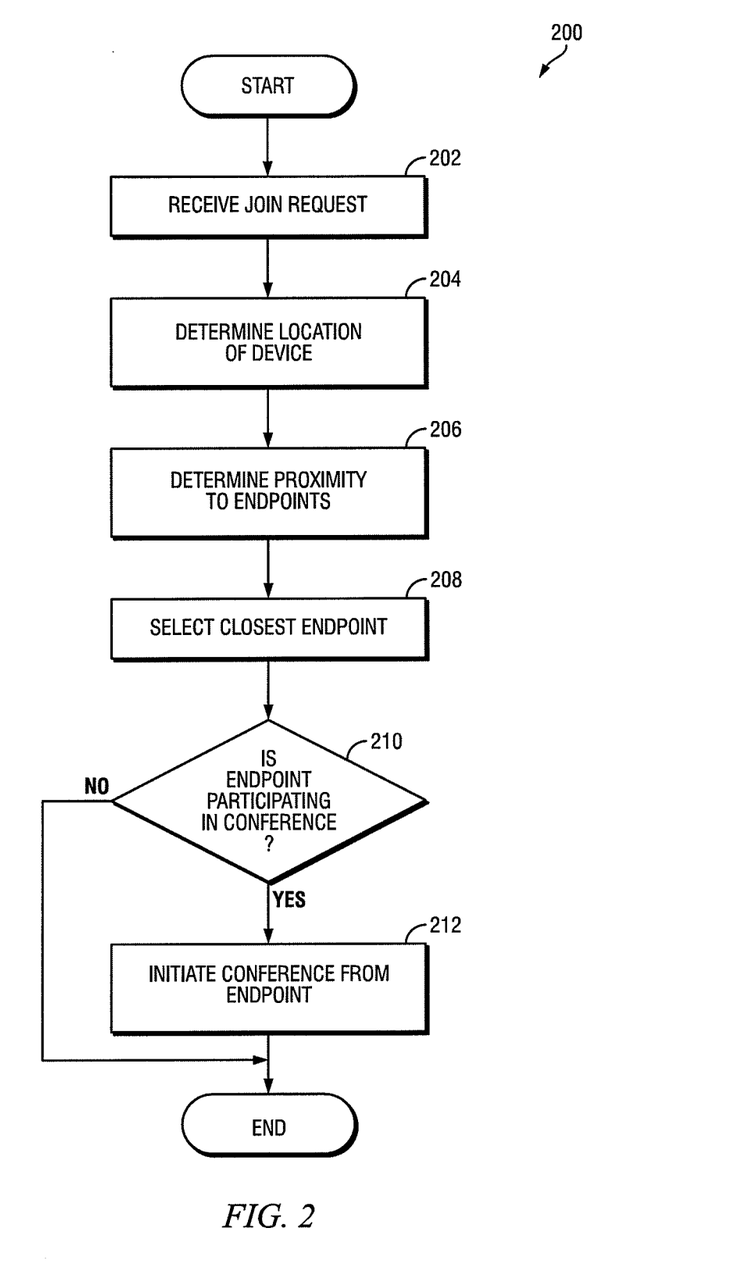
FIG. 2 illustrates an example conferencing method, in accordance with certain embodiments of the present disclosure.

FIG. 2 illustrates an example conferencing method 200, in accordance with certain embodiments of the present disclosure. At step 202, a first request to join a conference is received from a first user device. As described above, the join request may be received from a user of a mobile device that maintains a wireless connection with a network, in particular embodiments.

At step 204, a location of the first user device may be determined at step 204. In a particular embodiment, determining the location of the first user device may include detecting the wireless connection of the first user device with a network. The location of the first user device may then be determined based on the wireless connection of the first user device. For example, triangulation may be used to determine the location of the first user device based on the wireless connection.

At step 206, the proximity of the first user device relative to a plurality of endpoints configured to facilitate the conference may be identified. A first one of the plurality of endpoints may be selected for handling the conference at step 208. The selected endpoint may be more proximate (i.e., closer) to the first user device than other ones of the plurality of endpoints.

At step 210, a determination may be made as whether the selected endpoint is already participating in the conference. If the selected endpoint is already participating in the conference, no further action may required for the user to join the conference, and the method may terminate. If, however, the selected endpoint is not already participating in the conference, the conferencing session may be automatically initiated at the selected endpoint at step 212. In a particular embodiment, initiating the conferencing session may include identifying a call-in number associated with the selected endpoint and automatically dialing the call-in number. In other embodiments, the call-in number may not be automatically dialed. Instead, a message may be transmitted to the first user device. The message may include a prioritized list of all endpoints that may facilitate or handle the conferencing system. The list may be prioritized such that the endpoint that is closest to the first user device is listed first and the endpoint that is furthest from the first user device is listed last.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Figure 3:
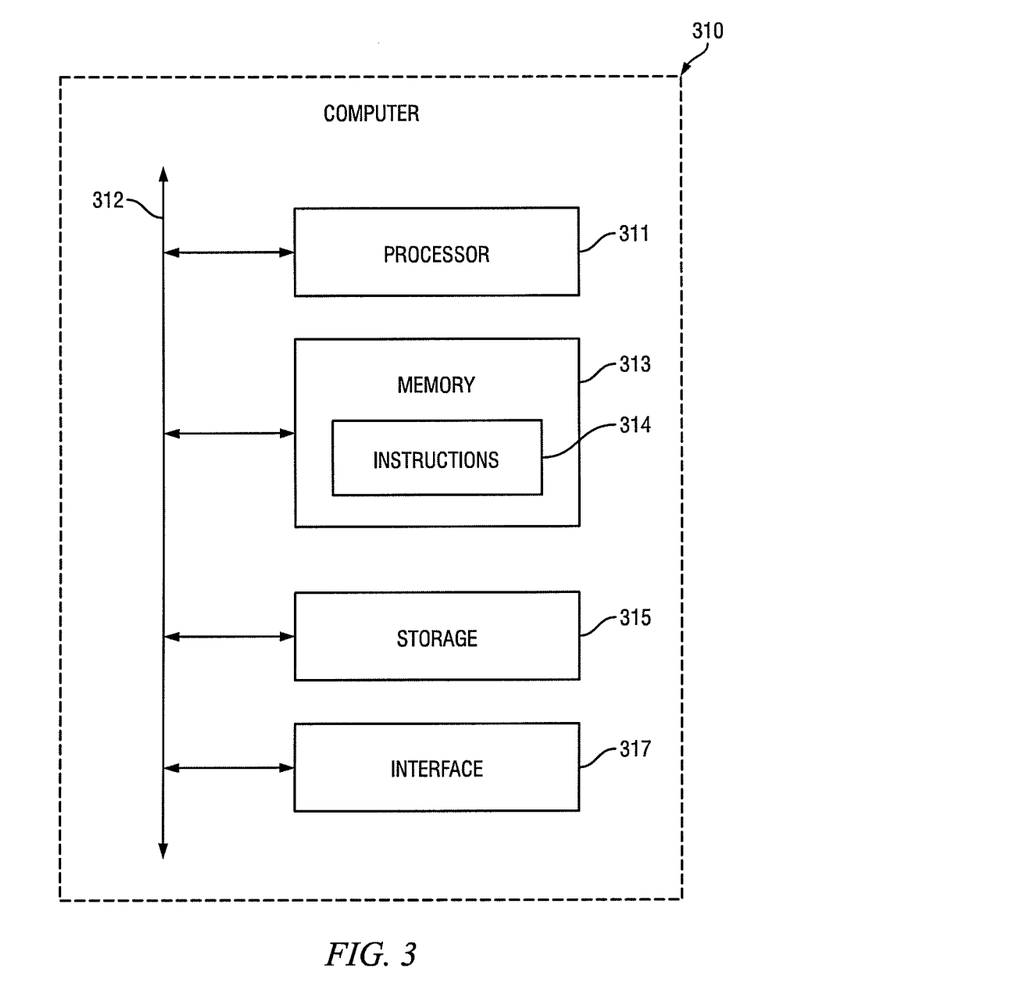
FIG. 3 illustrates an example computer that may be used, in accordance with certain embodiments of the present disclosure.

FIG. 3 illustrates a block diagram of a computer 300 that may be used in accordance with particular embodiments. For instance, in particular embodiments, computer 300 may be included in one or more user devices 114, endpoints 112, controller 120, and/or MSE 122. Each computer 300 may include its own respective processor 311, memory 313, instructions 314, storage 315, interface 317, and bus 312. These components may work together to perform one or more steps of one or more methods and provide the functionality described herein. For example, in particular embodiments, instructions 314 in memory 313 may be executed on processor 311 in order to perform one or more methods (e.g. the method of FIG. 3) based on text-based messages (e.g. e-mail messages) monitored by interface 317. In certain embodiments, instructions 314 may reside in storage 315 instead of, or in addition to, memory 313.

The components of computer 300 may comprise any suitable physical form, configuration, number, type and/or layout. As an example, and not by way of limitation, computer 300 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer 300 may include one or more computer systems; be unitary or distributed; span multiple locations; span multiple machines; or reside in a cloud, which may include one or more cloud components in one or more networks.

Processor 311 may be a microprocessor, controller, application specific integrated circuit (ASIC), or any other suitable computing device operable to provide, either alone or in conjunction with other components (e.g., memory 313 and instructions 314) group formation suggestion functionality. Such functionality may include providing various features discussed herein. In particular embodiments, processor 311 may include hardware for executing instructions 314, such as those making up a computer program or application. As an example and not by way of limitation, to execute instructions, processor 311 may retrieve (or fetch) instructions 314 from an internal register, an internal cache, memory 313 or storage 315; decode and execute them; and then write one or more results to an internal register, an internal cache, memory 313, or storage 315.

In particular embodiments, processor 311 may include one or more internal caches for data, instructions (e.g., instructions 314), or addresses. This disclosure contemplates processor 311 including any suitable number of any suitable internal caches, where appropriate. As an example and not by way of limitation, processor 311 may include one or more instruction caches, one or more data caches, and one or more translation lookaside buffers (TLBs). Instructions in the instruction caches may be copies of instructions 314 in memory 313 or storage 315 and the instruction caches may speed up retrieval of those instructions by processor 311. Data in the data caches may be copies of data in memory 313 or storage 315 for instructions 314 executing at processor 311 to operate on; the results of previous instructions executed at processor 311 for access by subsequent instructions executing at processor 311, or for writing to memory 313, or storage 315; or other suitable data. The data caches may speed up read or write operations by processor 311. The TLBs may speed up virtual-address translations for processor 311. In particular embodiments, processor 311 may include one or more internal registers for data, instructions, or addresses. Depending on the embodiment, processor 311 may include any suitable number of any suitable internal registers, where appropriate. Where appropriate, processor 311 may include one or more arithmetic logic units (ALUs); be a multi-core processor; include one or more processors 311; or any other suitable processor.

Memory 313 may be any form of volatile or non-volatile memory including, without limitation, magnetic media, optical media, random access memory (RAM), read-only memory (ROM), flash memory, removable media, or any other suitable local or remote memory component or components. In particular embodiments, memory 313 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 313 may include one or more memories 313, where appropriate. Memory 313 may store any suitable data or information utilized by computer 310, including software (e.g., instructions 314) embedded in a computer readable medium, and/or encoded logic incorporated in hardware or otherwise stored (e.g., firmware). In particular embodiments, memory 313 may include main memory for storing instructions 314 for processor 311 to execute or data for processor 311 to operate on. In particular embodiments, one or more memory management units (MMUs) may reside between processor 311 and memory 313 and facilitate accesses to memory 313 requested by processor 311.

As an example and not by way of limitation, computer 300 may load instructions 314 from storage 315 or another source (such as, for example, another computer system, another platform, or another device coupled to computer 300) to memory 313. Processor 311 may then load the instructions 314 from memory 313 to an internal register or internal cache. To execute instructions 314, processor 311 may retrieve the instructions 314 from the internal register or internal cache and decode them. During or after execution of instructions 314, processor 311 may write one or more results (which may be intermediate or final results) to the internal register or internal cache. Processor 311 may then write one or more of those results to memory 313. In particular embodiments, processor 311 may execute only instructions in one or more internal registers or internal caches or in memory 313 (as opposed to storage 315 or elsewhere) and may operate only on data in one or more internal registers or internal caches or in memory 313 (as opposed to storage 315 or elsewhere).

In particular embodiments, storage 315 may include mass storage for data or instructions (e.g., instructions 314). As an example and not by way of limitation, storage 315 may include a hard disk drive (HDD), a floppy disk drive, flash memory, an optical disc, a magneto-optical disc, magnetic tape, or a Universal Serial Bus (USB) drive or a combination of two or more of these. Storage 315 may include removable or non-removable (or fixed) media, where appropriate. Storage 315 may be internal or external to computer 300, where appropriate. In particular embodiments, storage 315 may be non-volatile, solid-state memory. In particular embodiments, storage 315 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 315 may take any suitable physical form and may comprise any suitable number or type of storage. Storage 315 may include one or more storage control units facilitating communication between processor 311 and storage 315, where appropriate.

Interface 317 may include hardware, encoded software, or both providing one or more interfaces for communication (such as, for example, packet-based communication) between computer 300 and any other computer systems on network 110. As an example, and not by way of limitation, interface 317 may include a network interface controller (NIC) or network adapter for communicating with an Ethernet or other wire-based network and/or a wireless NIC (WNIC) or wireless adapter for communicating with a wireless network. Interface 317 may include one or more connectors for communicating traffic (e.g., IP packets) via a bridge card. Depending on the embodiment, interface 317 may be any type of interface suitable for any type of network in which computer 300 is used. The network may include an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. Computer 300 may include any suitable interface 317 for any one or more of these networks, where appropriate.

In some embodiments, interface 317 may include one or more interfaces for one or more I/O devices. One or more of these I/O devices may enable communication between a person and computer 300. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 317 for them. Where appropriate, interface 317 may include one or more drivers enabling processor 311 to drive one or more of these I/O devices. Interface 317 may include one or more interfaces 317 where appropriate.

Bus 312 may include any combination of hardware, software embedded in a computer readable medium, and/or encoded logic incorporated in hardware or otherwise stored (e.g., firmware) to couple components of computer 310 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 312 may include any number, type, and/or configuration of buses 312, where appropriate. In particular embodiments, one or more buses 312 (which may each include an address bus and a data bus) may couple processor 311 to memory 313. Bus 312 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 311 (such as, for example, one or more internal registers or caches), one or more portions of memory 313, one or more portions of storage 315, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software (e.g. instructions 314) may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system, comprising:
a processor communicatively coupled, via a wireless network, to a first user device at a remote location within an enterprise; and
a non-transitory computer-readable storage medium embodying software that is operable when executed by the processor to:
receive a first request to join a conference from a first user device;
detect a wireless connection of the first user device with the wireless network; and
track the first user device to the remote location within the enterprise based on the wireless connection of the first user device with the wireless network;
based on the remote location of the first user device, identify a proximity of the first user device relative to a plurality of endpoints configured to facilitate the conference; and
select a first one of the plurality of endpoints for handling the conference, the first one of the plurality of endpoints being more proximate to the remote location of the first user device than other ones of the plurality of endpoints.

2. The system of claim 1, wherein, when determining the remote location of the first user device, the software is operable when executed by the processor to use triangulation to determine the remote location of the first user device.

3. The system of claim 1, wherein the software is further operable when executed by the processor to:
receive a second request to join the conference from a second user device;
determine a location of the second user device;
based on the location of the second user device, identify a proximity of the second user device relative to the plurality of endpoints configured to facilitate the conference;
select the first one of the plurality of endpoints as being more proximate to the second user device than the other ones of the plurality of endpoints; and
determine that the conference has already been initiated by the selected one of the plurality of endpoints and that no further action is needed to initiate the conference.

4. The system of claim 1, wherein the software is further operable when executed by the processor to automatically initiate the conference with the first one of the plurality of endpoints that was selected as being more proximate to the first user device.

5. The system of claim 4, wherein, when automatically initiating the conference with the first one of the plurality of endpoints, the software is further operable when executed by the processor to:
identify a call-in number associated with the selected one of the plurality of endpoints; and
automatically dial the call-in number associated with the selected one of the plurality of endpoints.

6. The system of claim 1, wherein the software is further operable when executed by the processor to transmit a message to the first user device, the message comprising a prioritized list of the plurality of endpoints, wherein the first one of the plurality of endpoints that was selected as being more proximate to the remote location of the first user device is listed first in the prioritized list.

7. The system of claim 1, wherein the software is further operable when executed by the processor to:
determine if automated dialing is enabled for the first one of the plurality of endpoints that was selected as being more proximate to the first user device;
if automated dialing is enabled, automatically dial a telephone number associated with the first one of the plurality of endpoint; and
if automated dialing is not enabled, transmit a message to the first user device, the message identifying the first one of the plurality of endpoints that was selected as being more proximate to the remote location of the first user device.

8. A method, comprising:
communicatively coupling, by a wireless network, at least one processor associated with a conferencing system and a first user device at a remote location within an enterprise;
receiving, by the at least one processor communicatively coupled to the wireless network, a first request to join a conference from a first user device;
detecting, by the at least one processor coupled to the wireless network, a wireless connection of the first user device with the wireless network; and
tracking, by the at least one processor coupled to the wireless network, the first user device to the remote location within the enterprise based on the wireless connection of the first user device with the wireless network;
based on the remote location of the first user device, identifying a proximity of the first user device relative to a plurality of endpoints configured to facilitate the conference; and
selecting a first one of the plurality of endpoints for handling the conference, the first one of the plurality of endpoints being more proximate to the remote location of the first user device than other ones of the plurality of endpoints.

9. The method of claim 8, wherein determining the remote location of the first user device comprises using triangulation to determine the remote location of the first user device.

10. The method of claim 8, further comprising:
receiving a second request to join the conference from a second user device;
determining a location of the second user device;
based on the location of the second user device, identifying a proximity of the second user device relative to the plurality of endpoints configured to facilitate the conference;
selecting the first one of the plurality of endpoints as being more proximate to the second user device than the other ones of the plurality of endpoints; and
determining that the conference has already been initiated by the selected one of the plurality of endpoints and that no further action is needed to initiate the conference.

11. The method of claim 8, further comprising automatically initiating the conference with the first one of the plurality of endpoints that was selected as being more proximate to the first user device.

12. The method of claim 11, wherein automatically initiating the conference with the first one of the plurality of endpoints comprises:
identifying a call-in number associated with the selected one of the plurality of endpoints; and
automatically dialing the call-in number associated with the selected one of the plurality of endpoints.

13. The method of claim 8, further comprising transmitting a message to the first user device, the message comprising a prioritized list of the plurality of endpoints, wherein the first one of the plurality of endpoints that was selected as being more proximate to the remote location of the first user device is listed first in the prioritized list.

14. The method of claim 9, further comprising:
determining if automated dialing is enabled for the first one of the plurality of endpoints that was selected as being more proximate to the first user device;
if automated dialing is enabled, automatically dialing a telephone number associated with the first one of the plurality of endpoint; and
if automated dialing is not enabled, transmitting a message to the first user device, the message identifying the first one of the plurality of endpoints that was selected as being more proximate to the remote location of the first user device.

15. One or more non-transitory computer-readable storage media embodying software that is operable when executed by a processor associated with a conferencing system to:
receive, via a wireless network, a first request to join a conference from a first user device at a remote location within an enterprise;
detect a wireless connection of the first user device with the wireless network; and
track the first user device to the remote location within the enterprise based on the wireless connection of the first user device with the wireless network;
based on the remote location of the first user device, identify a proximity of the first user device relative to a plurality of endpoints configured to facilitate the conference; and
select a first one of the plurality of endpoints for handling the conference, the first one of the plurality of endpoints being more proximate to the remote location of the first user device than other ones of the plurality of endpoints.

16. The non-transitory computer-readable storage media of claim 15, operable when executed to use triangulation to determine the remote location of the first user device.

17. The non-transitory computer-readable storage media of claim 16, further operable when executed to:
receive a second request to join the conference from a second user device;
determine a location of the second user device;
based on the location of the second user device, identify a proximity of the second user device relative to the plurality of endpoints configured to facilitate the conference;
select the first one of the plurality of endpoints as being more proximate to the second user device than the other ones of the plurality of endpoints; and
determine that the conference has already been initiated by the selected one of the plurality of endpoints and that no further action is needed to initiate the conference.

18. The non-transitory computer-readable storage media of claim 15, further operable when executed to automatically initiate the conference with the first one of the plurality of endpoints that was selected as being more proximate to the remote location of the first user device.

19. The non-transitory computer-readable storage media of claim 18, operable when executed to automatically initiate the conference with the first one of the plurality of endpoints by:
identifying a call-in number associated with the selected one of the plurality of endpoints; and
automatically dialing the call-in number associated with the selected one of the plurality of endpoints.

20. The non-transitory computer-readable storage media of claim 15, further operable when executed to transmit a message to the first user device, the message comprising a prioritized list of the plurality of endpoints, wherein the first one of the plurality of endpoints that was selected as being more proximate to the remote location of the first user device is listed first in the prioritized list.

21. The non-transitory computer-readable storage media of claim 15, further operable when executed to:
determine if automated dialing is enabled for the first one of the plurality of endpoints that was selected as being more proximate to the remote location of the first user device;
if automated dialing is enabled, automatically dial a telephone number associated with the first one of the plurality of endpoint; and
if automated dialing is not enabled, transmit a message to the first user device, the message identifying the first one of the plurality of endpoints that was selected as being more proximate to the remote location of the first user device.

22. A system, comprising:
means for communicatively coupling, by a wireless network, at least one processor associated with a conferencing system to a first user device at a remote location within an enterprise;
means for receiving, by the at least one processor via the wireless network, a first request to join a conference from the first user device at the remote location within the enterprise;
means for detecting, by the at least one processor associated with the conferring system, a wireless connection of the first user device with the wireless network; and
means for tracking, by the at least one processor associated with the conferencing system, the first user device to the remote location within the enterprise based on the wireless connection of the first user device with the wireless network;
means for identifying, based on the remote location of the first user device, a proximity of the first user device relative to a plurality of endpoints configured to facilitate the conference; and
means for selecting a first one of the plurality of endpoints for handling the conference, the first one of the plurality of endpoints being more proximate to the remote location of the first user device than other ones of the plurality of endpoints.

* * * * *